United States Patent [19]
Zeniya

[11] Patent Number: 5,199,990
[45] Date of Patent: Apr. 6, 1993

[54] APPARATUS FOR SOLDER-PLATING A LEAD-FRAME CARRYING ELECTRONIC COMPONENTS

[75] Inventor: Akira Zeniya, Kyoto, Japan
[73] Assignee: Zeniya Industry Co., Ltd., Kyoto, Japan
[21] Appl. No.: 696,833
[22] Filed: May 7, 1991
[30] Foreign Application Priority Data May 8, 1990 [JP] Japan ................................. 2-118468
May 8, 1990 [JP] Japan ................................. 2-118469

[51] Int. Cl.⁵ ............................ B05C 3/20; B05C 5/02
[52] U.S. Cl. ................................... 118/401; 118/407; 118/429; 228/43
[58] Field of Search ............... 118/401, 407, 429; 228/43

[56] References Cited

U.S. PATENT DOCUMENTS

| | | | |
|---|---|---|---|
| 2,673,549 | 3/1954 | Frucki | 118/401 |
| 2,937,108 | 5/1960 | Toye | 118/401 |
| 3,004,505 | 10/1961 | Dvorak | 118/429 |
| 4,563,976 | 1/1986 | Foell et al. | 118/401 |

FOREIGN PATENT DOCUMENTS

| | | | |
|---|---|---|---|
| 3346142 | 8/1985 | Fed. Rep. of Germany | 118/401 |
| 2-246106 | 10/1990 | Japan | |
| 954499 | 8/1982 | U.S.S.R. | 118/401 |

Primary Examiner—Michael G. Wityshyn
Attorney, Agent, or Firm—St. Onge Steward Johnston & Reens

[57] ABSTRACT

An apparatus capable of solder-plating only on lead-regions of a lead-frame carrying a multiplicity of electronic parts or components. It comprises a block made of a heat-resistant and solder-wettable metal immersed in a bath of molten solder. The block is provided with a horizontal path for the lead-frame at a plane sufficiently above a level of said molten solder, and a plurality of vertical conduits, extending from the bottom of the block, open at the horizontal path. The conduits are capable of replenishing the molten solder on a plateau provided on a lower inside face of the path by capillary action. The lead-regions of lead-frame which travels through the path contacts with the molten solder on the plateau.

7 Claims, 4 Drawing Sheets

APPARATUS FOR SOLDER-PLATING A LEAD-FRAME CARRYING ELECTRONIC COMPONENTS

FIELD OF THE INVENTION AND RELATED ART STATEMENT

1. Field of the Invention

The present invention relates to an apparatus for solder-dipping a lead-frame carrying a multiplicity of electronic parts or components to selectively coat lead-conductors regions of the lead-frame with a layer of solder.

2. Description of the Prior Art

Throughout this specification and claims, the term "lead-frame" is used to define a generally elongated thin (about 0.3 mm) metal plate of a shape of a comb. The lead-frame is composed of at least one elongated outer piece of the frame (hereinafter, referred to as "frame region") and a multiplicity of laterally extended pieces (hereinafter, referred to as "lead-regions") which serve as lead-conductors of the individual electronic parts or components after being severed from the frame-region at the assembling step. The metal may preferably be, for instance, a known Cu 42 alloy.

If said parts or components are to have their leads in both opposite sides thereof, it is convenient to provide a lead-frame having a pair of the longitudinal parallel frame-regions which are mutually connected by lateral section bars or tie bands for defining a predetermined uniform gap between the pair of parallel frame-regions and with lead-regions themselves. In order to facilitate the assembling step, it is customary to deposit a solder layer on said lead-frame beforehand. The deposition has hitherto been usually carried out by a simple dipping of lead-frame part in a solder bath or by a transfer of the molten solder by means of rollers.

The molten solder in the bath is constantly heated by a heater so as to maintain its molten state, and the electronic parts or components carried by the lead-frame are brought over the solder bath by any feeding means. Then, they are descended while directing their frame-region downwards to be brought into contact with the molten solder. In order to improve the contact and to reduce the possible oxidation of the molten solder at its surface, it is also customary to circulate the molten solder and to jet it against the lead-frame.

According to any of the conventional processes however, the lead-frame is wholly coated with a layer of solder without discriminating the frame-regions from the lead-regions. Only the latter regions are actually required to be coated with a solder-layer. This means a waste of solder as well as an excessive evolution of harmful gases due to the correspondingly excessive use of a solder flux. In addition to this, the conventional methods have another drawback that any impurities dissolved from the lead-frame might admix with the molten solder in the bath to accumulate therein, and the composition of the molten solder might be changed with the elapse of time.

In Tokkai Hei 2-246,106 (Japanese Unexamined Patent Publication) by the present inventor and one other person, which had not yet been published by the priority date of this application, there is disclosed an apparatus for solder-dipping process, composed of a block made of solder-wettable metal and immersed in a molten solder bath. In this prior art, the block is provided with a plurality of vertical slits and a horizontal path joining the vertical slits at their upper ends. According to this proposal, the molten solder ascending along the vertical slots up to their top by the capillary action is brought into contact with the lead-regions of the lead-frame passing through the horizontal path. By guiding the lead-frame to pass along the horizontal path so that only the lead-regions may contact the molten solder, it is possible to deposit a solder layer only on the lead-region.

Since the lead-regions of the lead-frame in the Tokkai '106 are arranged with spaces like a comb along the lengthwise direction of the lead-frame, the molten solder will be replenished through the comb-like spaces into the horizontal slot through the vertical slits, whenever each of the lead-regions passes over each of the vertical slots. For this reason, the solder layers can be deposited on both the top and bottom surfaces of the lead-regions. Furthermore, since the molten solder having ascended along the vertical slots does not flow reversely down to the bath, it is possible to maintain the purity of the molten solder in the bath constantly highly free from contamination by the impurities from the lead frame.

It is however disadvantageous in that some oxide layers possibly formed on the surface of the molten solder in the bath might occasionally be introduced into said vertical slits to cause their cloggings, because lateral sides of said vertical slits are open to air and to communicate with the surface of the molten solder. Thus, it is still insufficient for depositing a favorable solder layer.

OBJECTS AND SUMMARY OF THE INVENTION

The present invention intends to overcome the above-mentioned drawbacks and disadvantages inherent to the prior art, and has, as its object, a provision of an apparatus for solder-plating, which is simple in its structure and capable of selectively depositing a favorable solder layer only on the lead-regions without contaminating the molten solder, while reducing the undesirable clogging or choking of solder-feeding slots by oxides of the solder.

In accordance with the present invention there is provided an apparatus for solder-plating a lead-frame which carries a multiplicity of electronic components, which comprises:

i) a soldering bath containing molten solder,
ii) a heater provided in the soldering bath for heating the solder and maintaining the solder in its molten state, and
iii) a block made of a heat-resistant and solder-wettable metal supported on the soldering bath in a manner that at least a lower part including a bottom surface of the block is immersed in the molten solder, and provided with:
  a) at least one horizontal path extending across the block at a plane sufficiently above a level of the molten solder, having a cross-section capable of permitting unobstructed passage of the lead-frame therethrough, and having
    at least one longitudinal plateau on a lower inside surface of the path and
    at least one longitudinal inverted plateau whose planer configuration corresponds to that of the first mentioned plateau, on an upper inside surface of the path, both of the longitudinal plateau and the longitudinal inverted plateau being capable of contacting with a lead-region of the lead-frame during the passage, and b) at least one vertical conduit with substantially flat cross-section having an opening at the first mentioned plateau to communicate with the horizontal path and another opening at the bottom surface of the block and being capable of supplying a space formed between the plateau and the inverted plateau with molten solder by capillary action.

In the above-mentioned apparatus, said horizontal path may be provided with a pair of parallel plateaux and inverted plateaux being capable of contacting said lead-region of said lead-frame. Said inverted plateaux may be made to apply a pressure to said lead-region during said passage. The pressure may be brought by the weight of a fragmental block itself which also serves as a lid for the horizontal path or by any resilient means such as spring.

In the present invention, the word solder-plating is used to mean to form a solder layer on a face of a metal member such as lead-frame. The word solder-dipping might be used to mean it. However, the word solder-dipping may mislead the reader such that the lead-frame with electronic components fixed thereto may be dipped down into a molten solder bath through its molten solder surface open to air. Therefore, hereinafter, I prefer to use the word solder-plating rather than the solder-dipping herein to mean to deposit a solder layer on the metal surface. It should be noted that in this invention, the word solder-plating does not include electroplating, but it includes deposition of solder layer through contacting the metal surface to be plated to molten solder.

A part of said block, which part is above and corresponding to said horizontal path may preferably be designed to be an openable lid for the path and hinged on the rest of the block. The lid may be provided with openings communicating with said horizontal path for venting gas generated inside said path.

Alternatively, the apparatus may be modified to have an additional set of vertical conduit which is in parallel with said first-mentioned vertical conduit in a common plane, wherein said additional vertical conduit extends upwards by-passing said horizontal path to reach an opening provided on said inverted plateau and is also capable of supplying said opening with said molten solder by capillary action. In the above-mentioned modified apparatus, said additional vertical conduit may be formed as a branch of said first-mentioned vertical conduit, in other words, the conduits may join together in the lower part of the block.

In practical apparatus, said block may be composed of a plurality of detachable fragments. Each of the horizontal path and vertical conduits may preferably be formed between the fragments at their engagement faces when the fragments are combined in one body.

By configuring the apparatus as discussed above, the molten solder in the bath having a large surface tension is introduced into the horizontal path through the vertical conduits by capillary action, without contacting with air or any oxide layer floating on the surface of the molten solder, because said vertical conduits extend upwards from the bottom surface of the block, at a level sufficiently under the surface level of the molten solder. In addition to this the apparatus can selectively deposit solder layers of favorably limited uniform thicknesses only on the lead-regions of the lead-frame, regardless of the thickness and/or shape of the lead-frame, substantially eliminating the undesirable clogging of the vertical conduits by maintaining the purity of the molten solder constantly high. Thus, it is advantageous in improving the processing efficiency and in extending the time period of the uninterrupted operation.

While the novel features of the present invention are set forth particularly in the appended claims, the invention, both as to organization and content, will be better understood and appreciated, along with other objects and features thereof, from the following detailed description taken in conjunction with the appended drawings.

Figure 1:
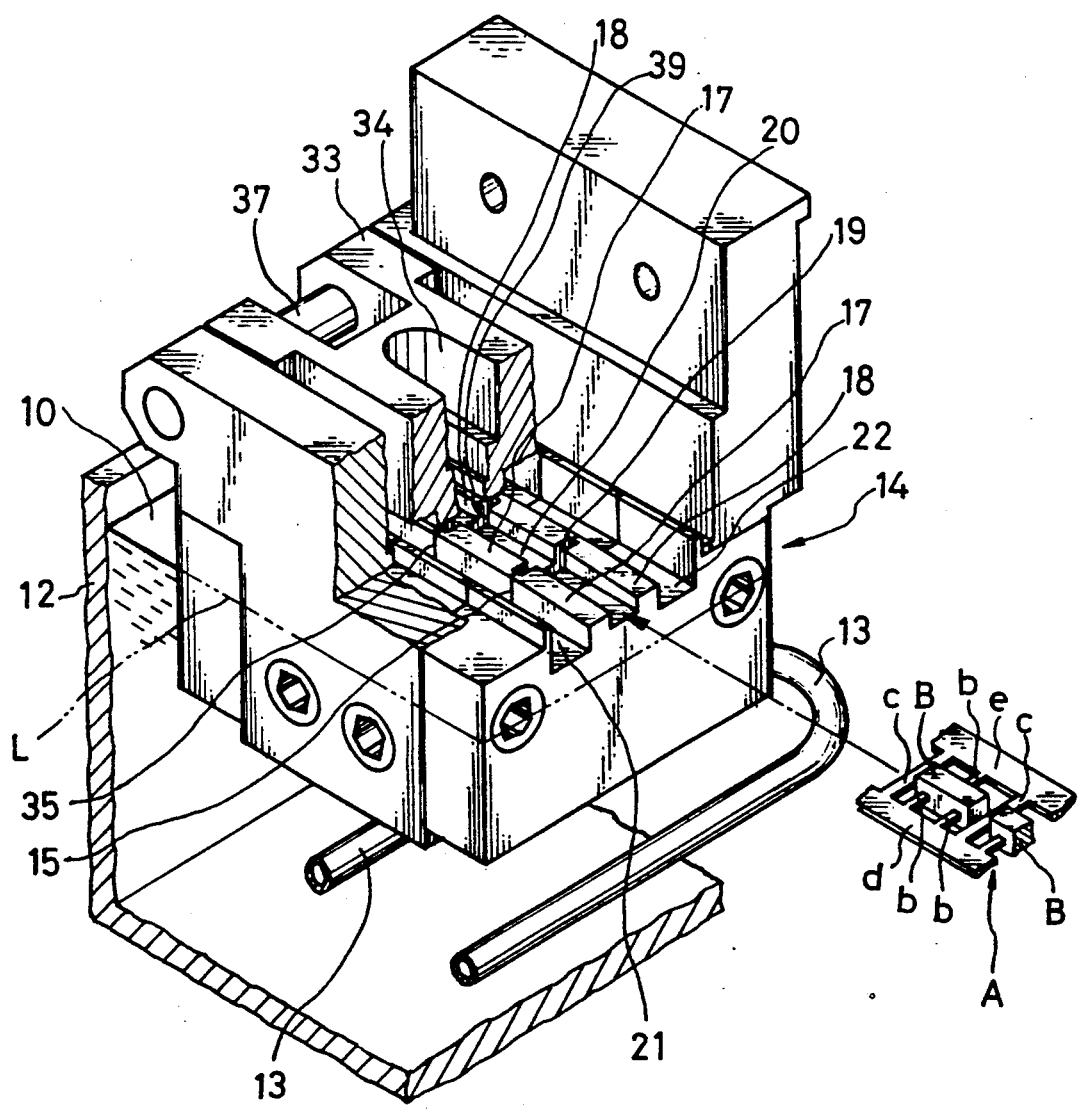
FIG. 1 is a partly cut-out perspective view of an embodiment of the apparatus for solder-plating built in accordance with the present invention.

It will be recognized that some or all of the Figures are schematic representations for purposes of illustration and do not necessarily depict the actual relative sizes or locations of the elements shown.

DESCRIPTION OF THE PREFERRED EMBODIMENT

In the following paragraphs, the present invention will be described in more detail, with reference to the preferred embodiment thereof shown in the drawings.

EXAMPLE 1

As shown in FIG. 1, a block 14 made of solder-wettable metal such as iron, nickel or alloy listed in JIS (Japanese Industrial Standard) as 50C or 55C and a sheathed heater 13 are placed in a solder bath 12, which is filled with molten solder 10. The solder 10 is eutectic crystals of, for instance, tin and lead (Sn:Pb=63:37), and a double-dot chained line L indicates the upper level of the molten solder 10.

Figure 2:
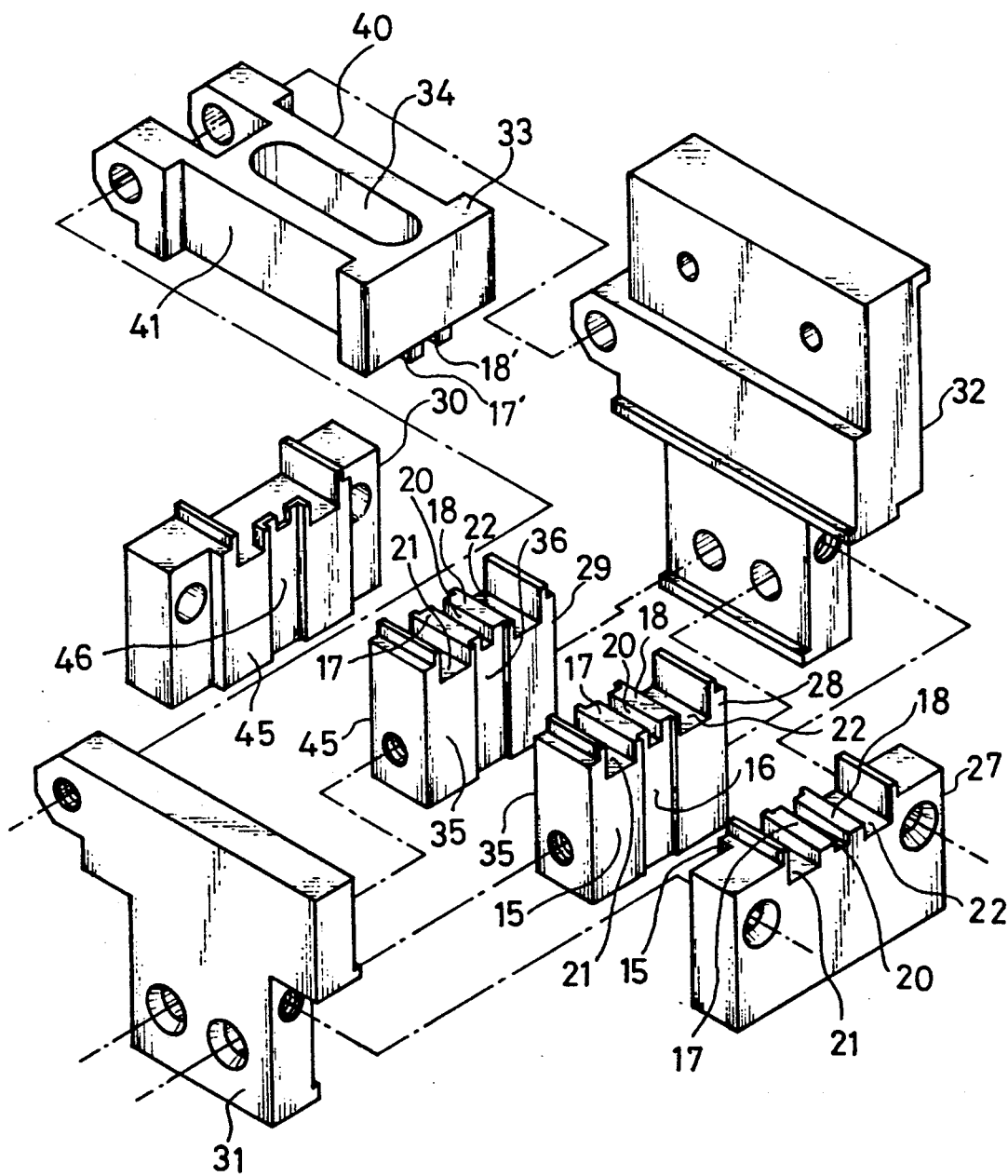
FIG. 2 is an exploded perspective view of the apparatus shown in FIG. 1.

As more illustratively shown in FIG. 2, the block 14 has a vertical conduit 16 with substantially flat cross-section, centering along a first vertical plane 15, namely a first engagement face or joining surface 15 of fragmental block 27 with the fragmental block 28. The vertical conduit 16 extends downwards sufficiently below the level L of the molten solder 10, and upwards to reach a couple of elongated plateaux 17 and 18. It opens a slot 19 stepping over a ditch 20 interposed between both plateaux 17 and 18. Outside both plateaux 17 and 18, there are another couple of ditches 21 and 22, extending across the block 14 in parallel with the plateaux 17 and 18. The plateaux 17 and 18, and the ditches 20, 21 and 22 form a lower inside face of the horizontal path.

Since an upper inside face of the horizontal path formed on the lower face of the upper block 33 is configured to have a substantially symmetrical configuration, a body B of an electronic part or component on the lead-frame A can pass through the ditch 20, and its frame-regions d and e on both sides of the lead-frame can pass through the ditches 21 and 22, respectively, while its lead-regions b on both sides of the body B as well as tie bands c can pass through a clearance formed between the upper faces of the plateaux 17 and 18 and the lower faces of the corresponding inverted plateaux 17' and 18' on the upper block 33.

Any of the bottoms of the ditches 20, 21 and 22 is placed at a position sufficiently above the level L of the molten solder. Since the shorter sides of section of the slot 19, which opens at the plateaux 17 and 18, stepping over the ditch 20, together with the vertical conduit 16, is designed to be sufficiently narrow (about 0.35 mm-0.4 mm) for effecting the capillary action, the molten solder on the plateaux is constantly replenished during the travel of the lead-frame A along the horizontal path. Incidentally, the longer side of the section of the slot 19 is 10 mm.

The same structures, as illustrated above with reference to the first joining surface 15, are taken after also in second and third joining surfaces 35 and 45, to which the same or similar functions as discussed above are assigned. Namely, second and third vertical conduits 36 and 46 are provided along the second and third joining surfaces 35 and 45. A second vertical slot 39, which communicates with the second vertical conduit 36 is shown FIG. 1.

As illustratively shown in FIG. 2, the block 14 is composed of 7 fragmental blocks 27, 28, 29, 30, 31, 32 and 33, and several bolts (omitted from FIG. 2) for combining these fragmental blocks in one body. By composing the block 14 as shown in FIG. 1 and FIG. 2, the horizontal path as well as the vertical conduits can be formed easily and precisely. More particularly, the vertical conduits 16, 36 and 46 are formed by combining shallow grooves engraved on each of the joining surfaces of the fragmental blocks 27, 28, 29 and 30.

The fragmental block 33, which serves as a lid for the horizontal path, has an opening 34 for venting gas evolved in the horizontal path, and is hinged to the side fragmental blocks 31 and 32 with a pin 37 to make the lid openable for maintaining the plateaux and the ditches clean. Lateral cut-outs 40 and 41 are also provided on the side of the fragmental block 33 in order to vent the gas.

Although only three vertical conduits are provided on the first through third vertical planes of the first example, more vertical conduits may be provided.

EXAMPLE 2

Figure 3:
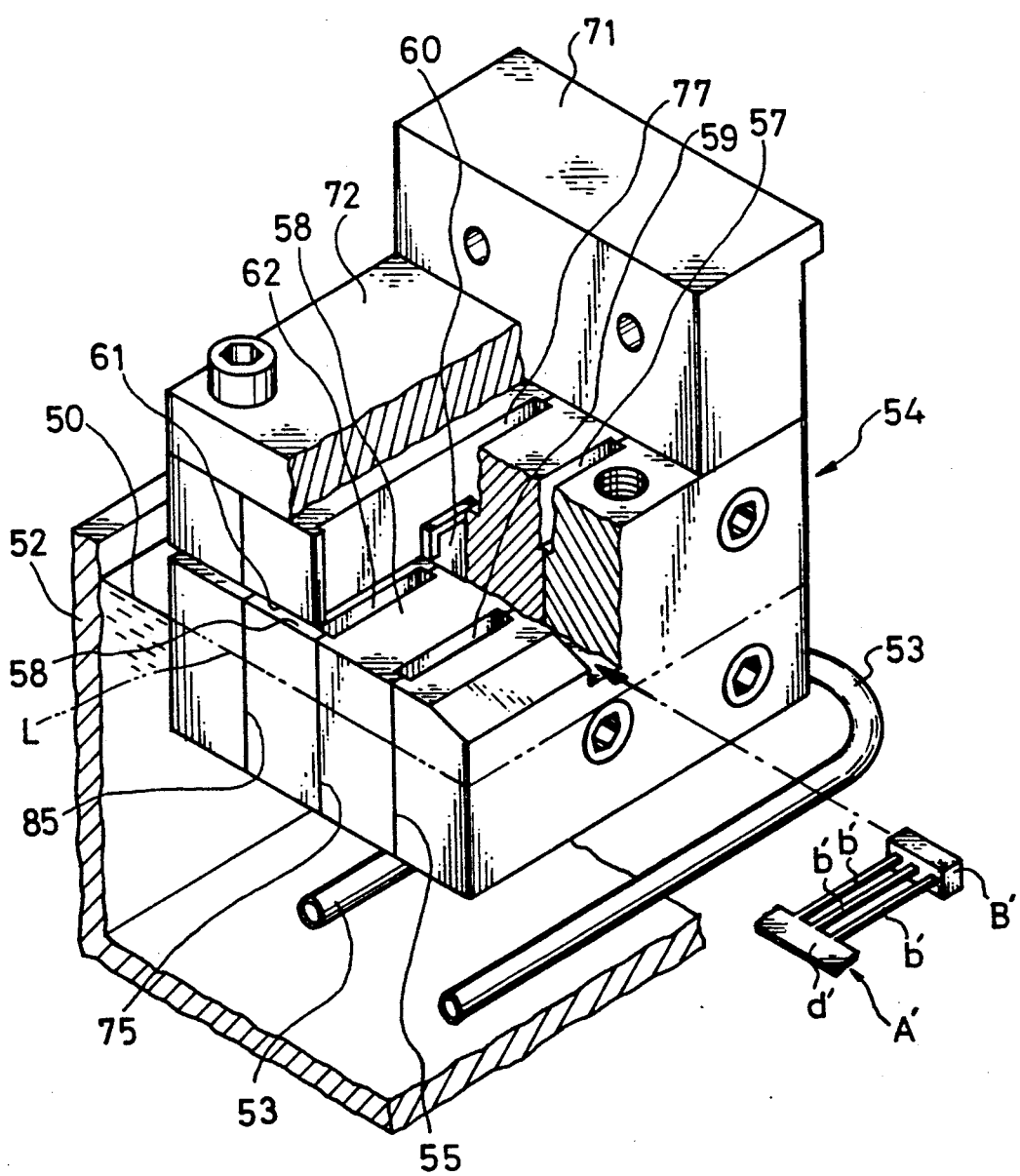
FIG. 3 is a partly cut-out perspective view of another embodiment of the apparatus for solder-dipping.

As shown in FIG. 3, a block 54 made of solder-wettable metal as used in the block 14 of EXAMPLE 1 and a sheathed heater 53 are placed in a solder bath 52 filled with molten solder 50 up to the level L indicated by the double chained line. As more illustratively shown in FIG. 4, the block 54 has a first vertical conduit 56 and a second vertical conduit 57, both with substantially flat cross-section centering along a first joining surface 55 between fragmental blocks 67 and 68. Both the vertical conduits 56 and 57 extend downwards sufficiently below the level L of the molten solder 50. When assembled, the top of the vertical conduit 56, which reaches a plateau 58, opens a slit 59 on the top of the plateau 58. In parallel with said plateau 58, there extends a ditch 60 across the block 54. The other vertical conduit 57, which has a planer configuration after a numeral 7, extends upwards, turning horizontally and then downwards, encircling around the ditch 60, and reaches an inverted plateau 61 to open another slit 62 on its surface. The face of the plateau 58 and the face of the inverted plateau 61 which faces to the former with a certain gap together from the horizontal path connected to the space of the ditch 60.

A body B' of an electronic part or component on the lead-frame A' can pass through the ditch 60, and its lead-regions b' connected to the body B' can pass through a clearance or the gap formed between the plateaux 58 and the corresponding inverted plateaux 61. The frame-region d' on the side of the lead-frame passes outside of the horizontal path.

The bottom of the ditch 60 is placed at a position sufficiently above the level L of the molten solder. Slots 59 and 62 are openings of the vertical conduits 56 and 57 in the assembled block 54 at the plateau 58 and at the inverted plateau 61, respectively. The widths of the slits 59 and 62 are designed to be sufficiently narrow for effecting the capillary action for the solder, so that the molten solder on the plateaux is constantly replenished during the travel of the lead-frame A'.

Figure 4:
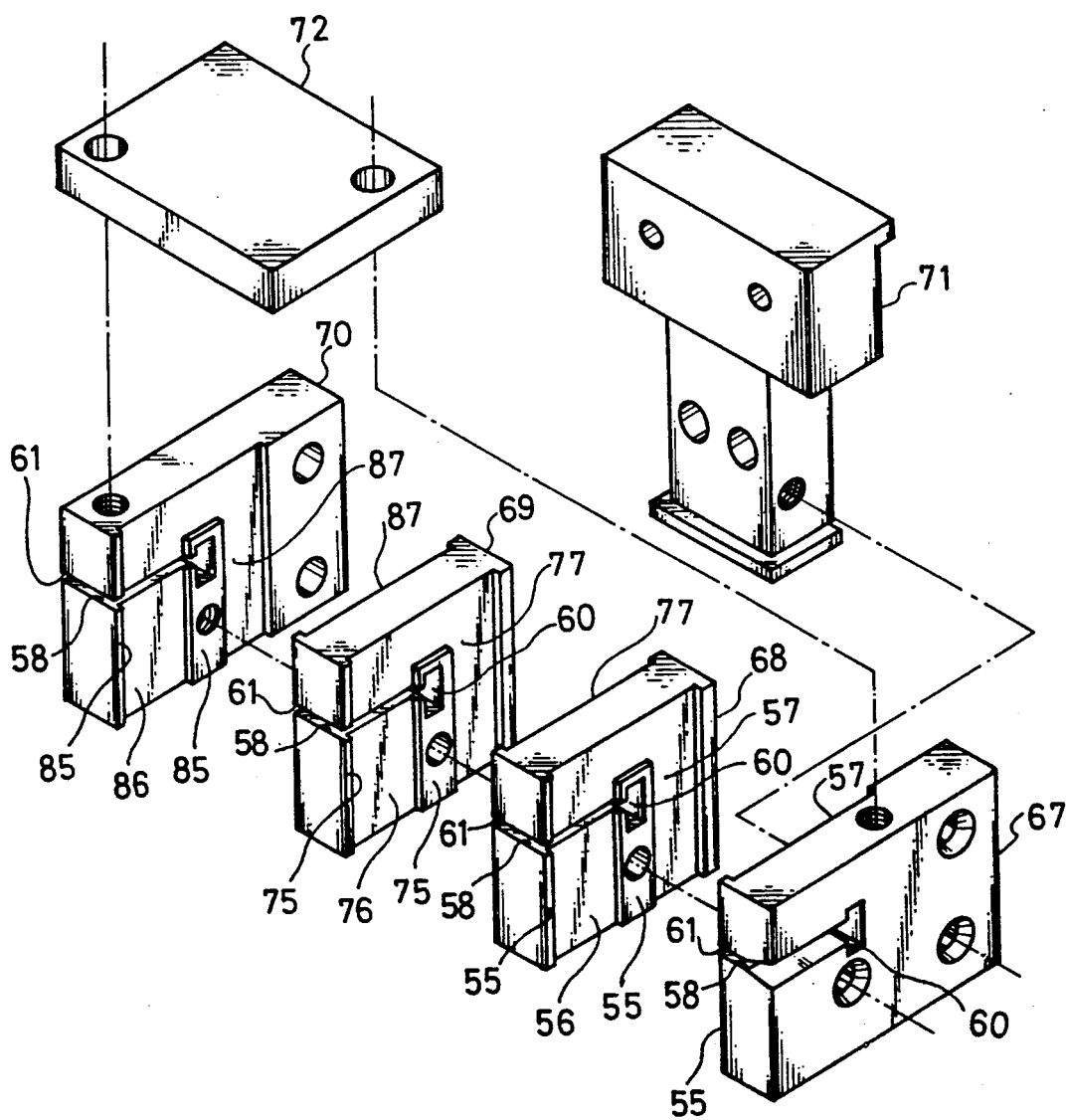
FIG. 4 is an exploded perspective view of the apparatus shown in FIG. 3.

The same structures as illustrated in FIG. 3 and FIG. 4 with reference to the first joining surface 55 are taken in a second and a third joining surfaces 75 and 85, to which the same or similar functions as discussed above are assigned. Namely, vertical conduits 76 and 77, as well as, 86 and 87 are provided on the second and the joining surfaces, respectively.

As illustratively shown in FIG. 4, the block 54 is composed of 6 fragmental blocks 67, 68, 69, 70, 71, and 72, and several bolts for combining these fragmental blocks in one body. By configuring the block 54 as shown in FIG. 3 and FIG. 4, the horizontal path as well as the vertical conduits can be formed easily and precisely. More particularly, the vertical conduits 56, 76 and 86 are formed by combining shallow grooves engraved on each of the joining surfaces 55, 75 and 85 of the fragmental blocks 67, 68, 69 and 70, respectively.

The fragmental block 72, which serves as a lid for the horizontal path parts of the conduits 57, 77 and 87, is especially designed to be easily removed for maintaining the plateaux and the ditches clean.

In the embodiment shown in FIG. 3 and FIG. 4, only three vertical conduits are provided on the first through third vertical planes, but more vertical conduits may be provided. Furthermore, the path for permitting the body B' of the lead-frame may be designed to be outside of the horizontal path 57. In this case, the ditch 60 may be dispensed with.

Although the present invention has been described in its preferred form with a certain degree of particularity, it is understood that the present disclosure of the preferred form has been changed in the details of construction and the combination and arrangement of parts and components may be resorted to without going out from the spirit and the scope of the invention as hereinafter claimed.

What is claimed is:

1. An apparatus for solder-plating a lead-frame which carries a multiplicity of electronic components, which comprises:
   i) a soldering bath containing molten solder,
   ii) a heater provided in said soldering bath for heating said solder and maintaining said solder in its molten state, and
   iii) a block, having a lower part including a bottom surface, made of a heat-resistant and solder-wettable metal, supported on said soldering bath in a manner that the lower part including at least the bottom surface of said block is immersed in said molten solder, and provided with:

a) at least one horizontal path extending across said block at a plane sufficiently above a level of said molten solder, having a cross-section capable of permitting unobstructed passage of said lead-frame therethrough, and having
   at least one longitudinal plateau on a lower inside surface of said path, and
   at least one longitudinal inverted plateau, whose planer configuration corresponds to that of the first mentioned plateau, on an upper inside surface of said path,
   both of said longitudinal plateau and said longitudinal inverted plateau being capable of contacting with a lead-region of said lead-frame during said passage, and
b) at least a first vertical conduit with substantially flat cross-section, having an opening at the first mentioned plateau to communicate with said horizontal path and another opening at the bottom surface of said block and being capable of supplying a space formed between said plateau and said inverted plateau, with molten solder by capillary action.

2. The apparatus as claimed in claim 1, wherein:
said horizontal path includes a pair of parallel plateaux and a pair of inverted plateaux being capable of contacting said lead-region of said lead-frame, and said inverted plateaux being capable of applying a pressure to said lead-region during said passage.

3. The apparatus as claimed in claim 2, wherein:
a part of said block above and corresponding to said horizontal path is hinged to the rest of the block to serve as an openable lid for the path and is provided with openings communicating with said horizontal path for venting gas generated inside said path.

4. The apparatus as claimed in claim 1, wherein:
a part of said block above and corresponding to said horizontal path is hinged to the rest of the block to serve as an openable lid for the path and is provided with openings communicating with said horizontal path for venting gas generated inside said path.

5. The apparatus as claimed in claim 1, which further comprises:
at least one additional vertical conduit provided in parallel with said first vertical conduit in a common plane, wherein said at least one additional vertical conduit extends upwards bypassing said horizontal path to reach an opening provided on said inverted plateau and is also capable of supplying said opening on said inverted plateau with said molten solder by capillary action.

6. The apparatus as claimed in claim 5, wherein:
said at least one additional verticle conduit is formed as a branch of said first verticle conduit.

7. The apparatus as claimed in any one of claims 1-6, wherein:
said block is composed of a plurality of fragmental blocks detachable with each other, and several bolts for combining the fragmental blocks in one.

* * * * *